United States Patent
Li et al.

(10) Patent No.: US 8,290,539 B2
(45) Date of Patent: Oct. 16, 2012

(54) BEAM SELECTION IN OPEN LOOP MU-MIMO

(75) Inventors: Guangjie Li, Beijing (CN); Yang Gao, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1237 days.

(21) Appl. No.: 12/057,727

(22) Filed: Mar. 28, 2008

(65) Prior Publication Data
US 2009/0042617 A1 Feb. 12, 2009

Related U.S. Application Data

(60) Provisional application No. 60/955,155, filed on Aug. 10, 2007.

(51) Int. Cl.
*H04W 72/00* (2009.01)

(52) U.S. Cl. ............... 455/562.1; 455/463; 455/464; 455/452.2; 375/267; 375/260; 375/347; 375/349

(58) Field of Classification Search ............ 375/267, 375/260, 347, 349; 455/463, 464, 452, 452.2, 455/562.1
See application file for complete search history.

(56) References Cited

U.S. PATENT DOCUMENTS

| | | | |
|---|---|---|---|
| 6,771,706 B2 * | 8/2004 | Ling et al. ............ | 375/267 |
| 7,403,748 B1 * | 7/2008 | Keskitalo et al. ........ | 455/101 |
| 7,623,603 B2 | 11/2009 | Li et al. | |
| 7,661,038 B2 | 2/2010 | Li et al. | |
| 7,685,219 B2 | 3/2010 | Li | |
| 7,751,368 B2 | 7/2010 | Li et al. | |
| 7,778,599 B2 | 8/2010 | Li et al. | |
| 7,818,013 B2 | 10/2010 | Li et al. | |
| 7,830,977 B2 | 11/2010 | Li et al. | |
| 7,831,232 B2 * | 11/2010 | Nakaya ........... | 455/277.1 |
| 7,907,677 B2 | 3/2011 | Li et al. | |
| 7,907,788 B2 | 3/2011 | Kawabe | |
| 7,986,680 B2 * | 7/2011 | Kim et al. ........... | 370/341 |
| 8,068,471 B2 * | 11/2011 | Kim et al. ........... | 370/339 |
| 2005/0037799 A1 * | 2/2005 | Braun et al. ......... | 455/525 |
| 2005/0064872 A1 * | 3/2005 | Osseiran et al. ........ | 455/452.1 |
| 2005/0101259 A1 * | 5/2005 | Tong et al. .......... | 455/69 |
| 2005/0190849 A1 * | 9/2005 | McNamara ........... | 375/267 |
| 2005/0195912 A1 * | 9/2005 | Kim et al. ........... | 375/267 |
| 2005/0281221 A1 * | 12/2005 | Roh et al. ........... | 370/328 |
| 2006/0264184 A1 * | 11/2006 | Li et al. ............ | 455/101 |

(Continued)

OTHER PUBLICATIONS

Spencer, et al., "An Introduction to the Multi-User MIMO Downlink", Adaptive Antennas and Mimo Systems for Wireless Communications, IEEE Communications Magazine, Oct. 2004, pp. 60-67.

(Continued)

*Primary Examiner* — Rafael Pérez-Gutiérrez
*Assistant Examiner* — Lameka J. Kirk
(74) *Attorney, Agent, or Firm* — Carrie A. Boone, P.C.

(57) ABSTRACT

A beam selection method in open loop MU-MIMO is disclosed, for an asymmetric antenna configuration. The proposed beam selection method employs limited feedback, as compared with single-user closed-loop MIMO and multiple-user closed-loop MIMO, in which the base station requires channel state information (CSI). The multi-user MIMO beam selection method selects the portion of beams from candidate beams for data transmission, meaning that the base station is training M beams. From this, the subscriber station selects N beams from the total M beams, with $N \leq M$.

9 Claims, 4 Drawing Sheets

U.S. PATENT DOCUMENTS

| | | | |
|---|---|---|---|
| 2006/0268769 A1* | 11/2006 | Pan et al. | 370/328 |
| 2007/0064641 A1* | 3/2007 | Laroia et al. | 370/320 |
| 2007/0099578 A1* | 5/2007 | Adeney et al. | 455/69 |
| 2007/0105508 A1* | 5/2007 | Tong et al. | 455/101 |
| 2007/0230608 A1 | 10/2007 | Li | |
| 2008/0056414 A1* | 3/2008 | Kim et al. | 375/347 |
| 2008/0108310 A1* | 5/2008 | Tong et al. | 455/69 |
| 2008/0125051 A1* | 5/2008 | Kim et al. | 455/67.13 |
| 2008/0165875 A1* | 7/2008 | Mundarath et al. | 375/262 |
| 2008/0198793 A1* | 8/2008 | Lysejko et al. | 370/328 |
| 2008/0219194 A1* | 9/2008 | Kim et al. | 370/310 |
| 2008/0267108 A1* | 10/2008 | Zhang et al. | 370/312 |
| 2009/0040936 A1 | 2/2009 | Wu et al. | |
| 2009/0041138 A1 | 2/2009 | Li et al. | |
| 2009/0047987 A1 | 2/2009 | Li et al. | |
| 2009/0074099 A1* | 3/2009 | Zheng et al. | 375/267 |
| 2009/0245153 A1 | 10/2009 | Li et al. | |
| 2010/0035644 A1 | 2/2010 | Wu et al. | |
| 2010/0056216 A1 | 3/2010 | Li et al. | |
| 2010/0058133 A1 | 3/2010 | Lee | |
| 2010/0064185 A1 | 3/2010 | Zheng et al. | |
| 2010/0086080 A1 | 4/2010 | Zhu et al. | |
| 2010/0142462 A1* | 6/2010 | Wang et al. | 370/329 |
| 2010/0142633 A1* | 6/2010 | Yu et al. | 375/260 |
| 2010/0172432 A1 | 7/2010 | Li et al. | |
| 2010/0227565 A1 | 9/2010 | Sun et al. | |
| 2010/0272047 A1 | 10/2010 | Zhu et al. | |
| 2010/0273435 A1 | 10/2010 | Sun et al. | |
| 2010/0329316 A1 | 12/2010 | Sun et al. | |
| 2011/0009076 A1 | 1/2011 | Li et al. | |
| 2011/0013603 A1 | 1/2011 | Li et al. | |
| 2011/0075752 A1 | 3/2011 | Zheng et al. | |
| 2011/0158218 A1 | 6/2011 | Li et al. | |

OTHER PUBLICATIONS

Maltsev, et al., "Advanced Wireless Communication Systems and Techniques", U.S. Appl. No. 61/110,544, filed Oct. 31, 2008, 91 pages.

* cited by examiner

BEAM SELECTION IN OPEN LOOP MU-MIMO

CROSS-REFERENCE TO RELATED APPLICATIONS

This application claims priority under 35 U.S.C. 119(e) to U.S. Provisional Patent Application No. 60/955,155, entitled, "ADVANCED WIRELESS COMMUNICATION SYSTEMS AND TECHNIQUES", filed on Aug. 10, 2007.

TECHNICAL FIELD

This application relates to multiple-input, multiple-output (MIMO) communication and, more particularly, to multiple-user MIMO.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g, as well as 802.16, are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps). An 802.16m standard has been initiated, which supports the International Telecommunication Union (ITU) IMT-ADVANCE (also known as "4G"). Advanced MIMO is essential technology to fulfill the target requirement of IMT-ADVANCE.

Single-user MIMO, or SU-MIMO, involves communications between a single base station (BS) and a mobile station (MS) or subscriber station (SS). Multiple-user MIMO, or MU-MIMO, is concerned with communication between the BS and multiple MSs or SSs. During the uplink, multiple MSs transmit data to the BS; during the downlink, the BS transmits signals to multiple MSs in a single resource block. MU-MIMO may benefit from both multi-user diversity and spatial diversity, and can obtain higher throughput than the SU-MIMO system.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a beam selection method in open loop MU-MIMO, for an asymmetric antenna configuration, is disclosed. The proposed MU-MIMO method employs limited feedback, as compared with single-user closed-loop MIMO and multiple-user closed-loop MIMO, in which the base station requires channel state information (CSI). The multi-user MIMO beam selection method selects the portion of beams from candidate beams for data transmission, meaning that the base station is training M beams. From this, the subscriber station selects N beams from the total M beams, with $N \leq M$.

Figure 1:
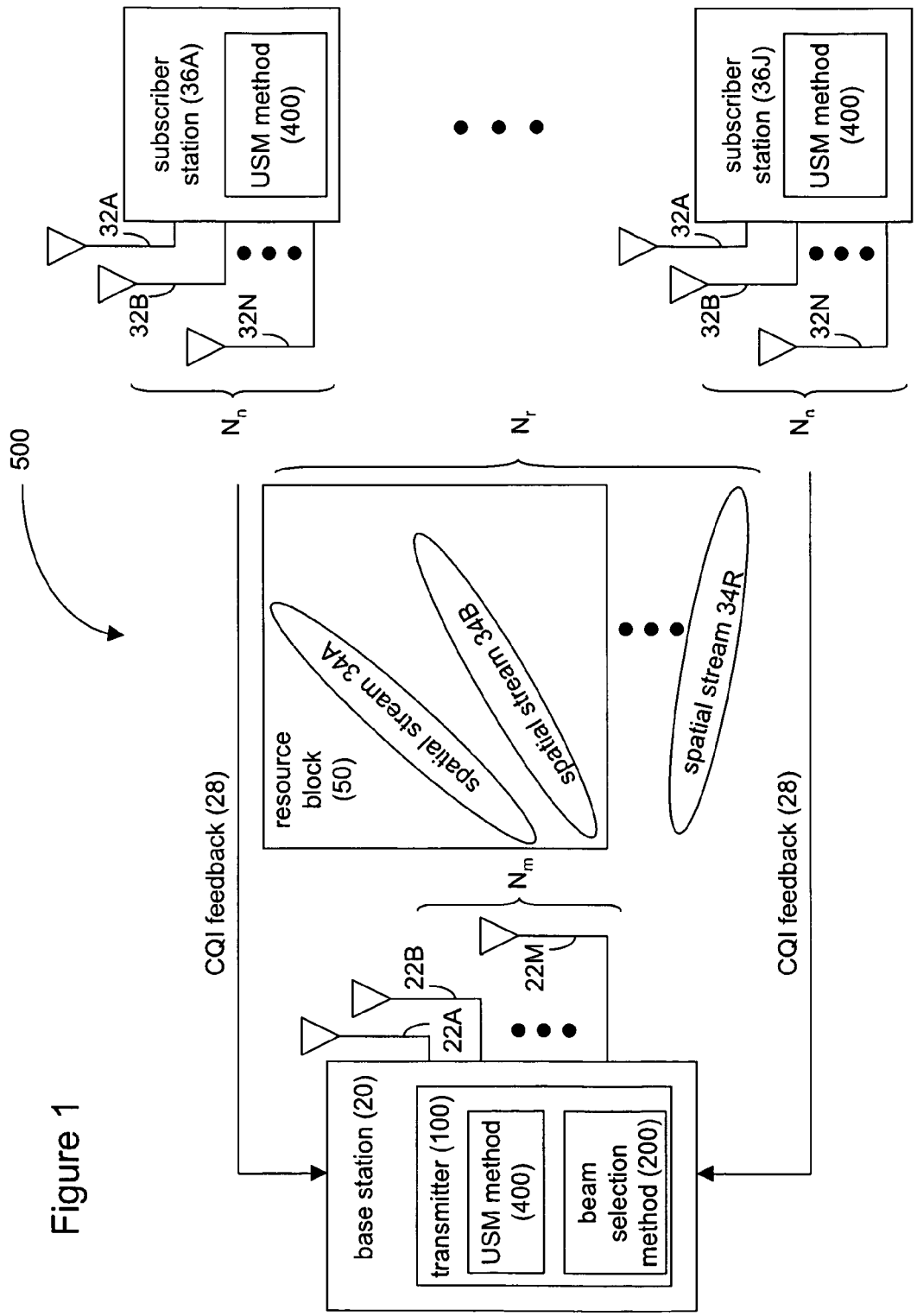
FIG. 1 is a block diagram of a USM system, including a beam selection method, according to some embodiments.

FIG. 1 is a diagram of a USM system 500, according to some embodiments. The USM system 500 (where USM is short for "user, single or multiple") consists of a base station 20 and J subscriber stations (receivers) 36A, ..., 36J (collectively, subscriber stations 36), each of which has multiple antennas 22, 32. The base station 20 includes a transmitter 100, which is described in more detail in FIG. 2, below. The base station 20 has m antennas 22A, 22B, ..., 22M (collectively, transmit antennas 22). The subscriber stations 36 each have n antennas 32A, 32B, ..., 32N (collectively, receive antennas 32). In the USM system 500, the transmit antenna number, $N_m$, is larger than the receiver antenna number, $N_n$, for each subscriber station 36. Stated mathematically, $N_m > N_n$. The base station 20 generates a resource block 50, which may consist of multiple spatial streams 34.

Each subscriber station 36 transmits CQI feedback 28 to the base station 20. In the USM system 500, the base station 20 transmits multiple fixed or semi-static spatial streams 34A, 34B, ..., 34R (collectively, spatial streams 34) in each resource block (only one resource block 50 is depicted in FIG. 1). Each resource block may have different spatial streams 34. The spatial streams 34 may be scheduled to multiple users or to a single user, according to the CQI feedback 28 received from each subscriber station 36 in a unified manner, with no single-user/multiple-user mode adaptation needed, as described in more detail, below. The terms SS and user refer to the same entity 36 shown in FIG. 1, and these terms are used interchangeably throughout the detailed description.

The USM system 500 employs a USM method 400, also described herein, according to some embodiments. The USM method 400 is an algorithm that enables the multiple-antenna base station 20 to communicate with many multiple-antenna subscriber stations 36, as depicted in FIG. 1, using spatial streams 34 and CQI feedback 28. The base station 20 and each of the subscriber stations 36 use the USM method 400, as shown in FIG. 1. The USM method 400 may consist of software, hardware, or a combination of software and hardware. The USM method 400 and system 500 are described in more detail in U.S. patent application Ser. No. 11/864,932, entitled "OPEN LOOP MU-MIMO", filed on Sep. 29, 2007.

Figure 2:
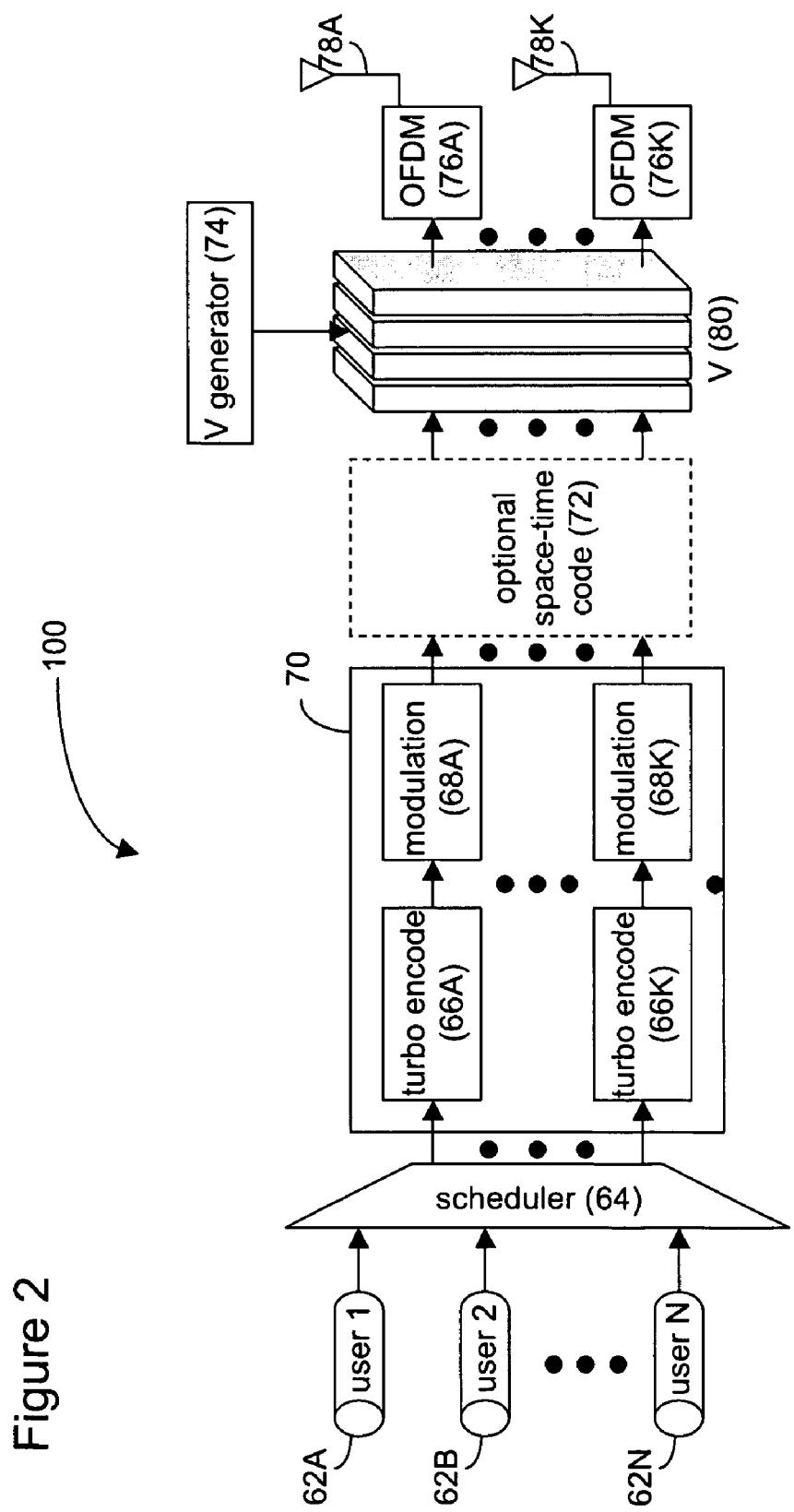
FIG. 2 is a diagram of a transmitter including the USM method of FIG. 1, according to some embodiments.

A transmitter 100 employing the USM method 400 is depicted in FIG. 2, according to some embodiments. The transmitter 100 may be part of the base station 20 in the USM system 500 (FIG. 1). The transmitter 100 transmits data to N users 62A, 62B, ..., 62N (collectively, users 62), with the users 62 being subscriber stations in the network neighborhood of the base station. The transmitter 100 includes a modulation/coding block 70, which includes multiple turbo encoders 66A, ... 66K and multiple modulators 68A, ... 68K, with K being equal to the number of spatial streams. The data streams are then optionally fed into a space-time code (STC) block 72, which do space-time encoding, such as SM, STBC, etc. The resulting data is then fed into the V matrix 80, produced by the V generator 74. In some embodiments, the V generator 74 uses a general transmission equation to generate the V matrix 80. The V generator 74 may further employ discrete Fourier transform on the data stream, as specified in equation 5, below. Finally, OFDM engines 76 multiplex the data signals before being transmitted over the air by antennas 78A, ..., 78K.

In the transmitter 100, the V matrix 80 is an $N_m \times N_s$ matrix, where $N_m$ is the number of transmit antennas and $N_s$ is the number of supported data streams. In the USM system 500 (FIG. 1), the number of supported data streams, $N_s$, is less than or equal to the number of antennas in the receiver, $N_n$, which is less than the number of antennas in the transmitter, $N_m$. Stated mathematically, $N_s \leq N_n < N_m$.

An allocated stream number, $N_r$, also known as the rank, is less than or equal to the supported number of data streams, $N_s$. Stated mathematically, $N_r = \text{rank} \leq N_s$. The $N_s$ streams of data to be transmitted may be given by the following equation:

$$S = (s_0 s_1 \ldots s_{N_r-1})' \quad (1)$$

which may be multiplexed into $N_s$ streams (with some streams being empty) if rank $N_r < N_s$. The following equation is:

$$S^* = (s_{x_0} s_{x_1} \ldots s_{x_{N_s-1}})' \quad (2)$$

where $x_i$ defines the map from the allocated number of streams, $N_r$, of data to the supported number of streams, $N_s$, and if $x_i \notin [0:N_r-1]'$, $x_i=0$ The transmitted signal is represented by the following equation, also known as the transmission equation:

$$\begin{pmatrix} a_0 \\ a_1 \\ \vdots \\ a_{Nm-1} \end{pmatrix} = V_{k,t} \times S^* = (p_0 v_0 \quad p_1 v_1 \quad \cdots \quad p_{Ns-1} v_{Ns-1}) S^* \quad (3)$$

where $p_i \in [0:N_s-1]'$ are the power-loading factors, and $$\sum_{i=0}^{Ns-1} p_i = P.$$

When with equal power full rank, $$p_i = \frac{1}{Ns} P,$$

for any i. When with deficient rank ($N_r < N_s$), $p_i = 0$ when $x_i = 0$. More advanced power-loading may be utilized to boost the system throughput and improve the performance of the edge user.

For example, with a configuration of four transmit antennas ($N_m = 4$) and two stream configurations ($N_s = 2$), the matrix, V, is a 4×2 matrix. If $N_r = 1$, the result is a rank 1 MIMO. The transmission equation is:

$$\begin{pmatrix} a_1 \\ a_2 \\ a_3 \\ a_4 \end{pmatrix} = V_{k,t} \times S^* = (Pv_0 \quad 0) \begin{pmatrix} s_1 \\ 0 \end{pmatrix}$$

As a second example, a rank 2 MIMO with an equal power, using the USM method 400, results in the following transmission equation:

$$\begin{pmatrix} a_1 \\ a_2 \\ a_3 \\ a_4 \end{pmatrix} = V_{k,t} \times S^* = (1/2 Pv_0 \quad 1/2 Pv_1) \begin{pmatrix} s_1 \\ s_2 \end{pmatrix}$$

The V matrix is a unitary matrix, with its columns being orthogonal to one another. In a 4×2 case (four transmit antennas, two receive antennas), V is a 4×2 matrix, in which its two columns are orthogonal.

In the USM method 400, the V matrix 80 is selected from a pool. Subscriber stations in the wireless neighborhood of the base station will estimate the channel quality indicator (CQI) of each stream and feed the CQI information back to the base station. The base station will select one of the multiple users in the wireless neighborhood (e.g., the basic service set), and designate the selected user as the "best" user. This "best" user is associated with the spatial stream. In some embodiments, "best" user is defined according to some metric. For example, "best" may be defined according to the equation in the proportional fairness (PF) algorithm.

In the USM method 400, for a 4×2 antenna configuration, the subscriber station estimates the CQI of two streams. This CQI estimation information is fed back to the base station.

In order to further improve the system capacity, a beam selection method 200 is used, according to some embodiments. The receiver antenna number, $N_n$, is the maximum number of supported spatial streams in the proposal, and $N_s <= N_n < N_m$ in the asymmetric MIMO case. The beam selection method 200 does not fix the V matrix, as in the USM method 400. Instead, the beam selection method 200, residing in the transmitter 100 of the base station 20, utilizes the feedback information (the CQI feedback 28) from the subscriber station 36 to decide which combination of beams is to be used.

Figure 3:
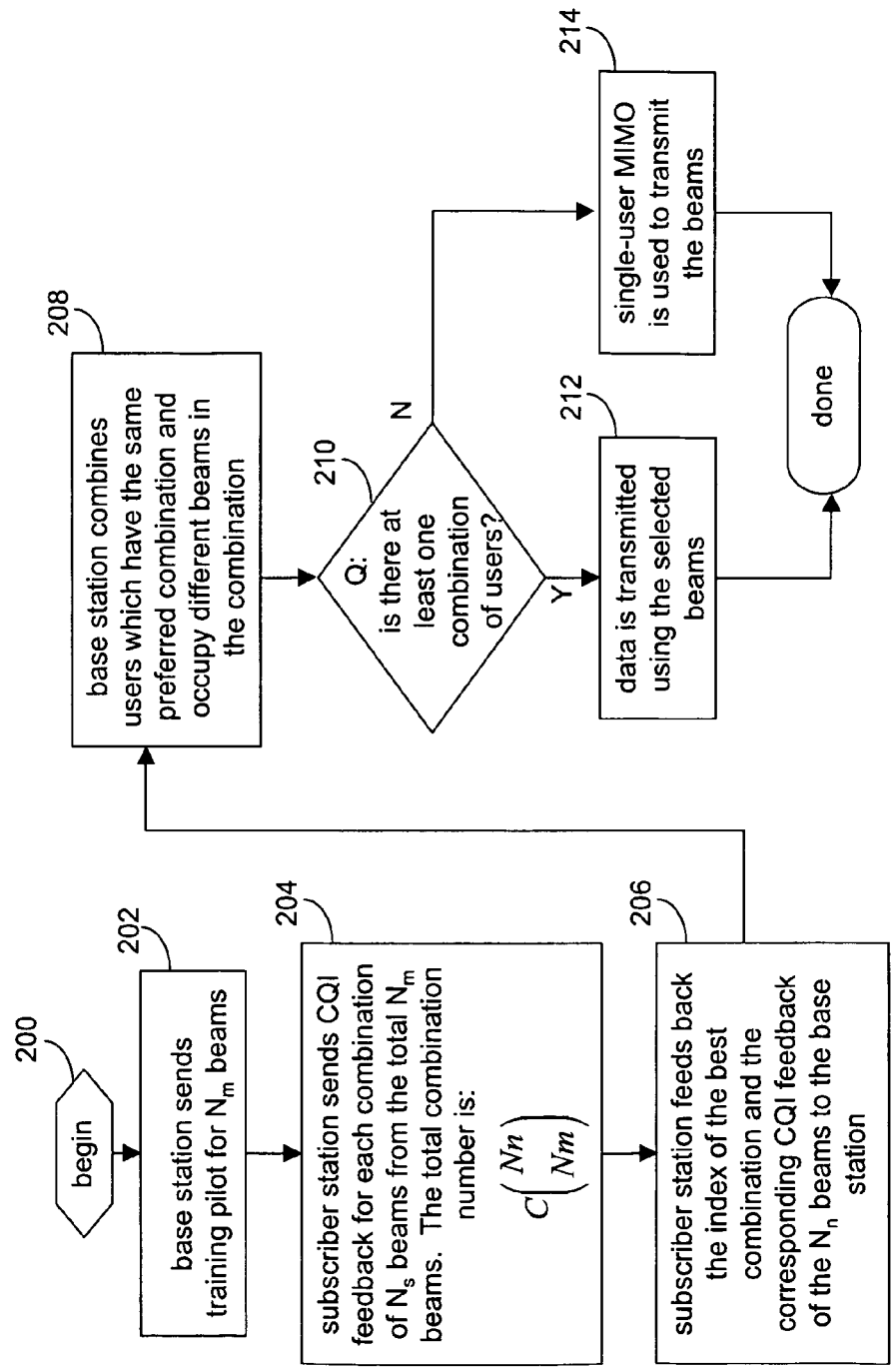
FIG. 3 is a flow diagram illustrating a beam selection method performed in the USM system of FIG. 1, according to some embodiments.

FIG. 3 is a flow diagram showing operations performed by the beam selection method 200, according to some embodiments. The beam selection method 200 commences with the base station 30 sending a training pilot for $N_m$ beams (block 202). The subscriber station 36 next sends the CQI feedback 28 of each combination of $N_s$ beams from the total $N_m$ beams to the base station 20 (block 204). The total combination number is given by:

$$C\binom{Nn}{Nm}$$

Next, the subscriber station 36 feeds back the index of the best combination and the corresponding CQI feedback 28 of the $N_n$ beams to the base station (block 206). From this information, the base station 20 combines those subscriber stations 36 (users) that have the same preferred combination and occupy different beams in the combination (block 208). Where there is at least one combination (pair) of users (block 210), the data is transmitted using the selected beams (block 212). Where there are no combinations of users, single-user (legacy) MIMO is used to transmit the beams (block 214).

Thus, the beam selection method 200 selects the portion of beams from candidate beams for data transmission. In essence, the base station 20 trains M beams and the subscriber station 36 selects N beams from the total M beams, where $N \leq M$. For example, in a 4×2 system, the base station 20 trains four beams, and the subscriber station 36 selects two of them for CQI estimation and data transmission.

The candidate $N_m \times N_n$ V matrix for a certain resource block is selected from a combination set. For each resource block, there is an $N_m \times N_m$ unitary matrix, $V_0$, which has $N_m$ columns. The index of the $N_m$ columns is (0, 1, . . . $N_{m-1}$). If the supported spatial stream number is $N_s$, the subscriber station 36 should estimate the CQI of $N_s$ streams under each combination of $N_s$ column vectors from the $V_0$ matrix as the precoding matrix.

For example, in a 4×2 asymmetric antenna configuration, $N_s$=2. The unity matrix, $V_0$, is given by the following equation: $V0=(\vec{v}_0 \ \vec{v}_1 \ \vec{v}_2 \ \vec{v}_3)$. There are six possible combinations that may result from selecting any two columns of the unity matrix, $V_0$. They are: $C_0=(\vec{v}_0 \ \vec{v}_1)$, $C_1=(\vec{v}_0 \ \vec{v}_2)$, $C_2=(\vec{v}_0 \ \vec{v}_3)$, $C_3=(\vec{v}_1 \ \vec{v}_2)$, $C_4=(\vec{v}_1 \ \vec{v}_3)$, and $C_5=(\vec{v}_2 \ \vec{v}_3)$. With a different combination of pre-coder matrixes, the channel quality is different, in some embodiments.

The subscriber station estimates the CQI of each spatial stream 34 under each combination of pre-coder matrixes, trying to ascertain the best combination. The index of the best combination is fed back to the base station 20, together with the CQI of two streams in the combination (see CQI feedback 28 in FIG. 1).

With six possible combinations available with a 4×2 asymmetric antenna configuration, three bits may be used for the feedback. However, in some embodiments, the performance where four combinations are available approaches the performance where six combinations are available. Accordingly, in some embodiments, the beam selection method 200 estimates the CQI of four combinations for a 4×2 asymmetric antenna configuration, with two-bit indicators for the combination of beams.

Figure 4:
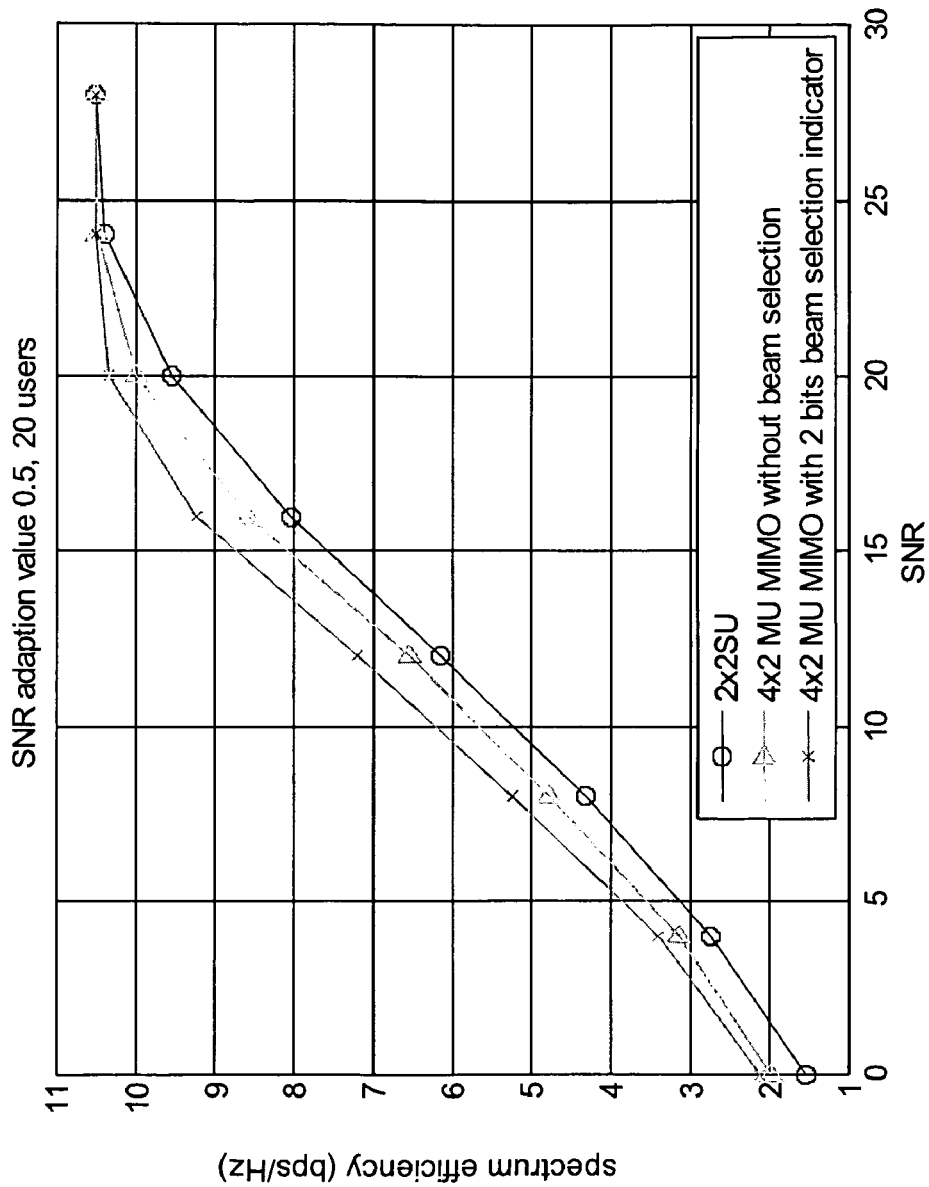
FIG. 4 is a graph comparing signal-to-noise ratio versus spectrum efficiency using the beam selection method of FIG. 3, according to some embodiments.

The performance of the 4×2 asymmetric antenna configuration with beam combination selection is illustrated in the graph 300 of FIG. 4, according to some embodiments, in which the signal-to-noise ratio (SNR) is plotted against spectrum efficiency (in bits per second per Hertz (bps/Hz).

While the application has been described with respect to a limited number of embodiments, those skilled in the art will appreciate numerous modifications and variations therefrom. It is intended that the appended claims cover all such modifications and variations as fall within the true spirit and scope of the above description.

We claim:

1. A beam selection method, comprising:
   receiving, by a base station, channel quality indicator feedback for each combination of a second number, $N_s$, of supported beams from a first number of beams, $N_m$, from a subscriber station, the subscriber station comprising a third number of antennas, $N_n$, wherein the second number, $N_s$, is less than or equal to the third number, $N_n$;
   receiving, by the base station, an index of a best combination of the second number, $N_s$, of supported beams from the subscriber station;
   receiving, by the base station, a channel quality indicator corresponding to the best combination from the subscriber station;
   combining, by the base station, the subscriber station with a second subscriber station if the base station also received the best combination from the second subscriber station but occupies different beams in the best combination; and
   transmitting, by the base station, data using the supported beams if the base station combined the second subscriber station with the subscriber station.

2. The beam selection method of claim 1, further comprising:
   sending, by the base station, a training pilot for the first number of beams, $N_m$, the base station comprising the first number, $N_m$, of antennas.

3. The beam selection method of claim 1, receiving channel quality indicator feedback for each combination of a second number of supported beams further comprising:
   receiving, by the base station, channel quality indicator feedback for each combination, wherein a total combination number is given by:

$$c\binom{Nn}{Nm}$$

where $N_n$ is the third number and $N_m$ is the first number.

4. The beam selection method of claim 1, further comprising:
   transmitting data, by the base station, using a single-user multiple-input-multiple-output if no second subscriber station is found that fed back the best combination to the base station.

5. The beam selection method of claim 1, receiving, by the base station, the channel quality indicator corresponding to the best combination further comprising:
   using, by the base station, two bits to feed back the channel quality indicator corresponding to the best combination, wherein the first number, $N_m$, of base station antennas is four and the second number, $N_n$, of subscriber station antennas is two.

6. The beam selection method of claim 1, receiving, by the base station, the channel quality indicator corresponding to the best combination further comprising:
   using, by the base station, three bits to feed back the channel quality indicator corresponding to the best combination, wherein the first number, $N_m$, of base station antennas is four and the second number, $N_n$, of subscriber station antennas is two.

7. A beam selection method, comprising:
   transmitting, by a subscriber station, channel quality indicator feedback for each combination of a second number, $N_s$, of supported beams from a first number of beams, $N_m$, to a base station, the base station comprising $N_m$ antennas, the subscriber station comprising a third number of antennas, $N_n$, wherein the second number, $N_s$, is less than or equal to the third number, $N_n$;
   transmitting, by the subscriber station, an index of a best combination of the second number, $N_s$, of supported beams to the base station;
   transmitting, by the subscriber station, a channel quality indicator corresponding to the best combination to the base station; and
   receiving, by the subscriber station, data using the supported beams, wherein a second subscriber station transmitted the best combination to the base station, wherein the second subscriber station occupies different beams in the best combination.

8. The beam selection method of claim 7, further comprising:
   receiving, by the subscriber station, a training pilot for the first number of beams, $N_m$.

9. The beam selection method of claim 8, further comprising:
   transmitting, by the subscriber station, channel quality indicator feedback for each combination, wherein a total combination number is given by:

$$c\binom{Nn}{Nm}$$

where $N_n$ is the third number and $N_m$ is the first number.

* * * * *

UNITED STATES PATENT AND TRADEMARK OFFICE
CERTIFICATE OF CORRECTION

PATENT NO. : 8,290,539 B2  Page 1 of 1
APPLICATION NO. : 12/057727
DATED : October 16, 2012
INVENTOR(S) : Guangjie Li et al.

It is certified that error appears in the above-identified patent and that said Letters Patent is hereby corrected as shown below:

On sheet 4 of 4, in Figure 4, line 1, delete "adaption" and insert -- adaptation --, therefor.

Signed and Sealed this
Nineteenth Day of February, 2013

Teresa Stanek Rea
*Acting Director of the United States Patent and Trademark Office*